United States Patent
Yin et al.

(10) Patent No.: US 12,257,679 B2
(45) Date of Patent: Mar. 25, 2025

(54) NAIL GUN WITH HIDDEN NAIL HEAD STRUCTURE

(71) Applicants: Zhenxing Yin, Zhejiang (CN); Junpeng Wei, Zhejiang (CN); Zhenhui Chen, Zhejiang (CN); Xiaorong Li, Zhejiang (CN); Fazheng Yang, Zhejiang (CN)

(72) Inventors: Zhenxing Yin, Zhejiang (CN); Junpeng Wei, Zhejiang (CN); Zhenhui Chen, Zhejiang (CN); Xiaorong Li, Zhejiang (CN); Fazheng Yang, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 51 days.

(21) Appl. No.: 18/306,173

(22) Filed: Apr. 24, 2023

(65) Prior Publication Data

US 2024/0208016 A1      Jun. 27, 2024

(51) Int. Cl.
B25C 1/00          (2006.01)

(52) U.S. Cl.
CPC ............. B25C 1/001 (2013.01); B25C 1/008 (2013.01)

(58) Field of Classification Search
CPC ................................ B25C 1/001; B25C 1/008
USPC .......................................................... 227/107
See application file for complete search history.

(56) References Cited

U.S. PATENT DOCUMENTS

| 5,649,660 | A | * | 7/1997 | Akiba | ................... | B25C 5/1665 |
|---|---|---|---|---|---|---|
| | | | | | | 227/123 |
| 2017/0095917 | A1 | * | 4/2017 | Lai | ........................ | B25C 1/047 |
| 2019/0299381 | A1 | * | 10/2019 | Hung | ..................... | B25C 1/188 |

* cited by examiner

*Primary Examiner* — Praachi M Pathak

(57) ABSTRACT

A nail gun with a hidden nail head structure includes a gun body, a nail magazine, and a nail head located at the nail exit of the nail magazine. The nail magazine is a component for supplying nails, and the gun body is a component for striking nails. The gun body has a connecting part extending towards the nail exit. The nail head is fixedly connected to the nail magazine on both sides by fasteners, and the upper part of the nail head is fixed to the connecting part by fasteners, realizing the hidden installation of the nail head. By adopting an insertion-type installation method, the nail head is hidden, making the overall appearance of the nail gun more elegant and attractive, with convenient assembly and connection, a more stable structure, simplified nail head structure, more convenient processing of components, and reduced manufacturing costs.

3 Claims, 8 Drawing Sheets

NAIL GUN WITH HIDDEN NAIL HEAD STRUCTURE

BACKGROUND OF INVENTION

Field of the Invention

The present invention relates to a nail gun with a hidden nail head structure.

Description of Related Art

Pneumatic nail guns, also known as pneumatic nailers, use air pressure generated by air pumps (air compressors) to drive the reciprocating movement of a piston striker in the nail gun cylinder, driving nails from the nail magazine into objects or shooting them out, thus realizing the nailing operation. In the structure of existing pneumatic nail guns, the nail head is basically fixed directly at the front end of the gun body, and the nail magazine is fixed at the bottom of the nail head. Due to the complexity of the nail head part structure (see FIG. 7), the processing of components is inconvenient, the processing cost of a single nail head component is high, leading to a higher overall manufacturing cost of the nail gun. Moreover, the exposed nail head makes the overall appearance of the nail gun less aesthetically pleasing (see FIG. 8), and the connection between the nail head and the nail magazine is inconvenient.

SUMMARY OF THE INVENTION

In view of the above-mentioned shortcomings, the present invention provides a nail gun with a hidden nail head structure. To achieve the above purpose, the present invention provides a nail gun with a hidden nail head structure, comprising a gun body, a nail magazine, and a nail head located at the nail exit of the nail magazine. The nail magazine is a component for supplying nails, the gun body is a component for striking nails, and the gun body has a connecting part extending towards the nail exit. The nail head is fixedly connected to the nail magazine on both sides by fasteners, and the upper part of the nail head is fixed to the connecting part by fasteners, realizing the hidden installation of the nail head; By adopting an insertion-type installation method, the nail head is hidden, making the overall appearance of the nail gun more elegant and attractive, with convenient assembly and connection, a more stable structure, simplified nail head structure, more convenient processing of components, and reduced manufacturing costs.

As a further improvement of the scheme, the nail magazine comprises two shell plates detachably connected, and both the inner and outer sides of the nail head have integrally formed two first screw columns and one second screw column. The two first screw columns are connected by a rib, and the second screw column is located between the two first screw columns and maintains verticality with the rib. Both shell plates are formed with a first accommodating chamber and a second accommodating chamber, the first accommodating chamber is used to accommodate the first screw columns and the rib, and the second accommodating chamber is used to accommodate the second screw column.

In the above technical solution, the nail magazine adopts a split design, and both shell plates have a first accommodating chamber and a second accommodating chamber, providing good containment for the first screw column, rib, and second screw column, improving the assembly accuracy between the nail head, nail magazine, and gun body, and facilitating the positioning and installation of the nail head, resulting in a more compact and reasonable nail exit structure.

As a further improvement of the scheme, the two shell plates are made of lightweight composite material, one end of the two shell plates is formed with a groove and connected by a spring clip embedded in the groove, and the other end of the two shell plates is connected by a screw.

In the above technical solution, the use of lightweight material effectively reduces the weight of the entire nail gun, making it easier to extend the working time and relieve fatigue. The spring clip is embedded in the groove through elastic deformation, and during the subsequent use of the nail gun, the lasting elastic force of the spring clip ensures that the two shell plates remain closely attached, ensuring the stability of the overall structure of the nail magazine by using the spring clip fastening method at one end.

As a further improvement of the scheme, the gun body includes a safety frame, and the nail magazine is equipped with a nail push plate, a limiting block, and a limiting block reset spring. When the nail push plate reaches the high position, it can drive the limiting block to move upward, restricting the movement of the safety frame, and preventing the nail gun from empty firing.

In the above technical solution, when there is a lack of nails, the safety frame cannot move, preventing the nail gun from empty firing and damaging the surface of the object.

As a further improvement of the scheme, a nail-fixing device is provided on the nail head to prevent the nails to be shot from falling out of the muzzle position. In the above technical solution, the nail-fixing device can be a magnet, which has an adsorption effect on the top nail of the row. During the nailing process, if the top nail of the row separates before nailing, the magnet can also adsorb the separated single nail, preventing the separated single nail from sliding out.

The beneficial effects of the present invention compared to the prior art are: adopting an insertion-type installation method, hiding the nail head, making the overall appearance of the nail gun more elegant and attractive, convenient assembly and connection, more stable structure, simplified nail head structure, more convenient component processing, and reduced manufacturing costs; the nail magazine adopts a split design, both shell plates have a first accommodating chamber and a second accommodating chamber, providing good containment for the first screw column, rib, and second screw column, improving the assembly accuracy between the nail head, nail magazine, and gun body, and facilitating the positioning and installation of the nail head, resulting in a more compact and reasonable nail exit structure; using the spring clip fastening method at one end of the nail magazine ensures the stability of the overall structure of the nail magazine; the nail gun has an anti-empty firing function.

DETAILED DESCRIPTION OF THE INVENTION

Figure 1:
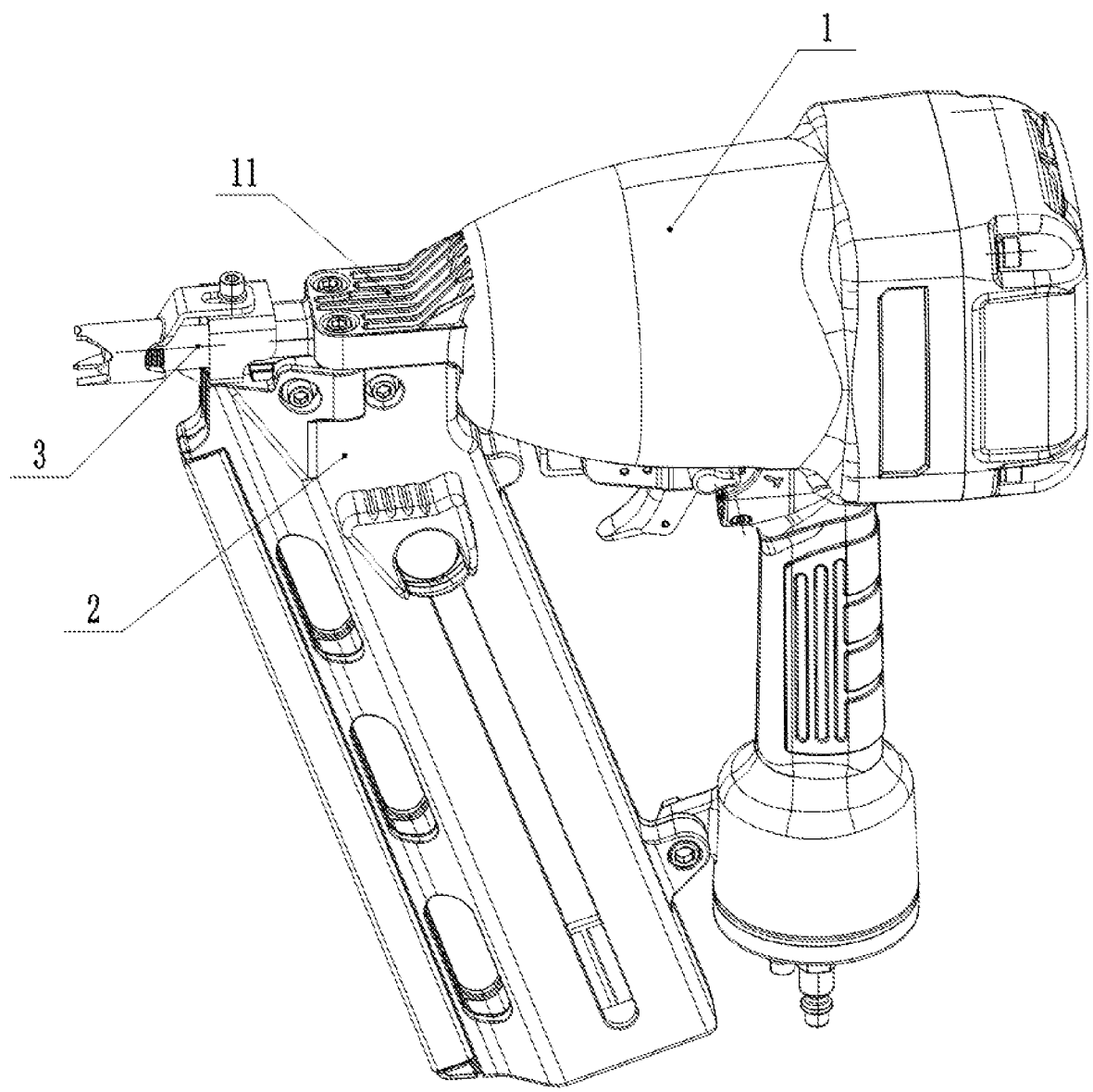
FIG. 1 is a perspective view of a nail gun with a hidden nail head structure according to the present invention.
Figure 4:
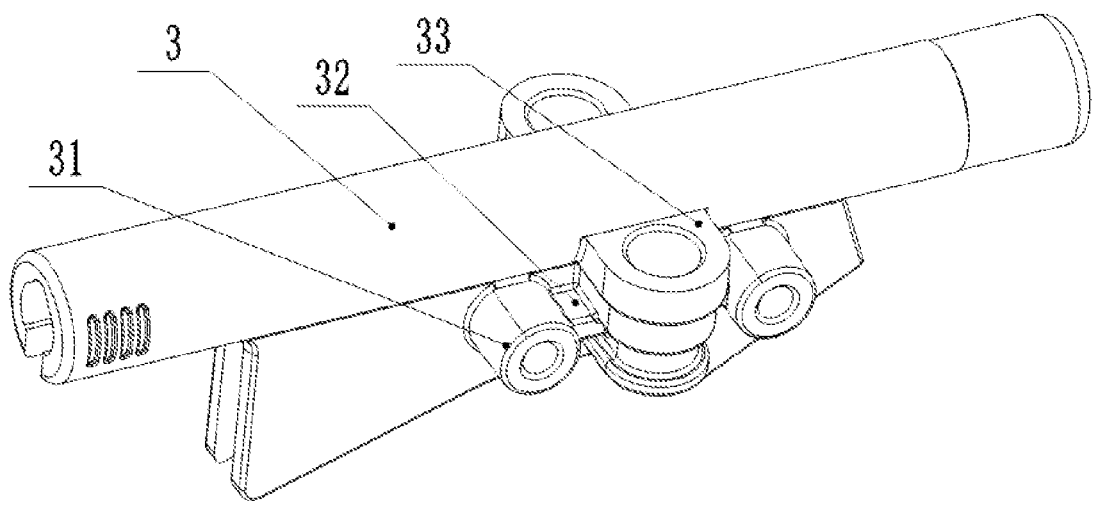
FIG. 4 is a schematic view of the nail head involved in the present invention.

As shown in FIGS. 1 and 4, an embodiment of the present invention discloses a nail gun with a hidden nail head structure, comprising a gun body (1), a nail magazine (2), and a nail head (3) located at the nail exit of the nail magazine (2); the nail magazine (2) is a component for supplying nails, and the gun body (1) is a component for striking nails. The gun body (1) has a connecting portion (11) extending toward the nail exit, the nail head (3) is fixedly connected to the nail magazine (2) on both sides by fasteners, and the upper part of the nail head (3) is fixed to the connecting portion (11) by fasteners, to achieve a hidden installation of the nail head (3).

Figure 5:
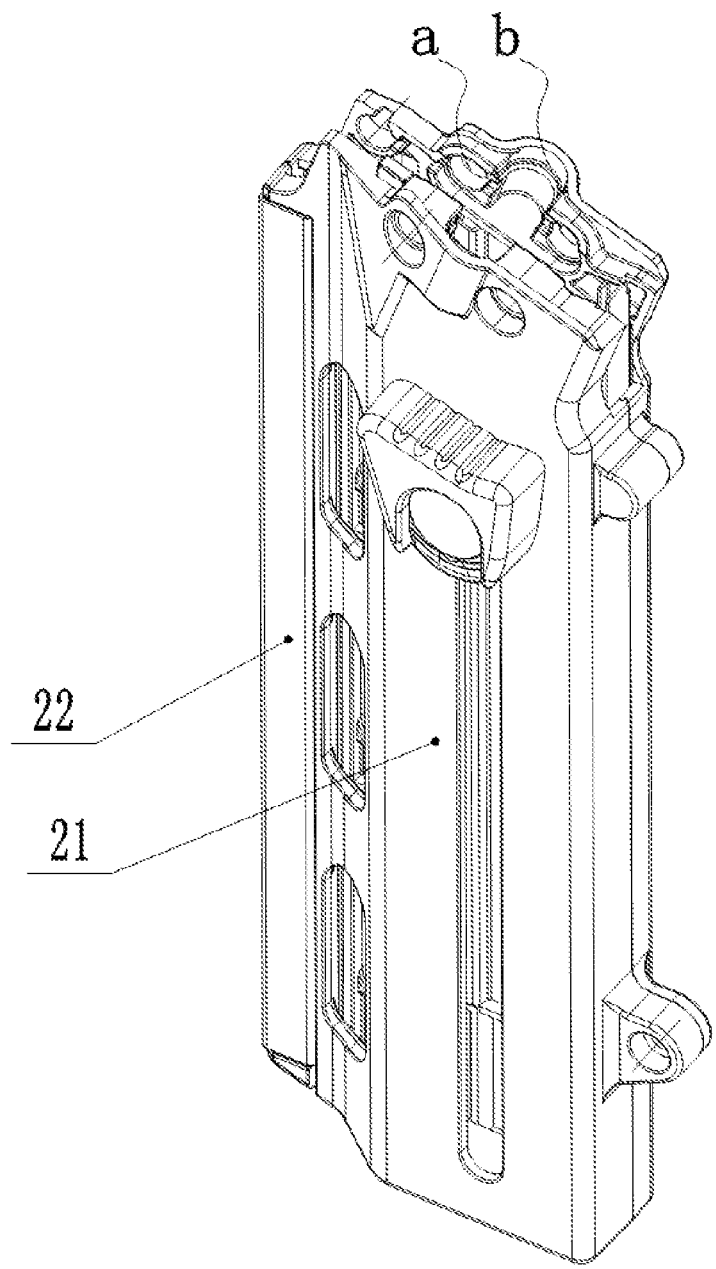
FIG. 5 is a schematic view of the nail magazine involved in the present invention.
Figure 6:
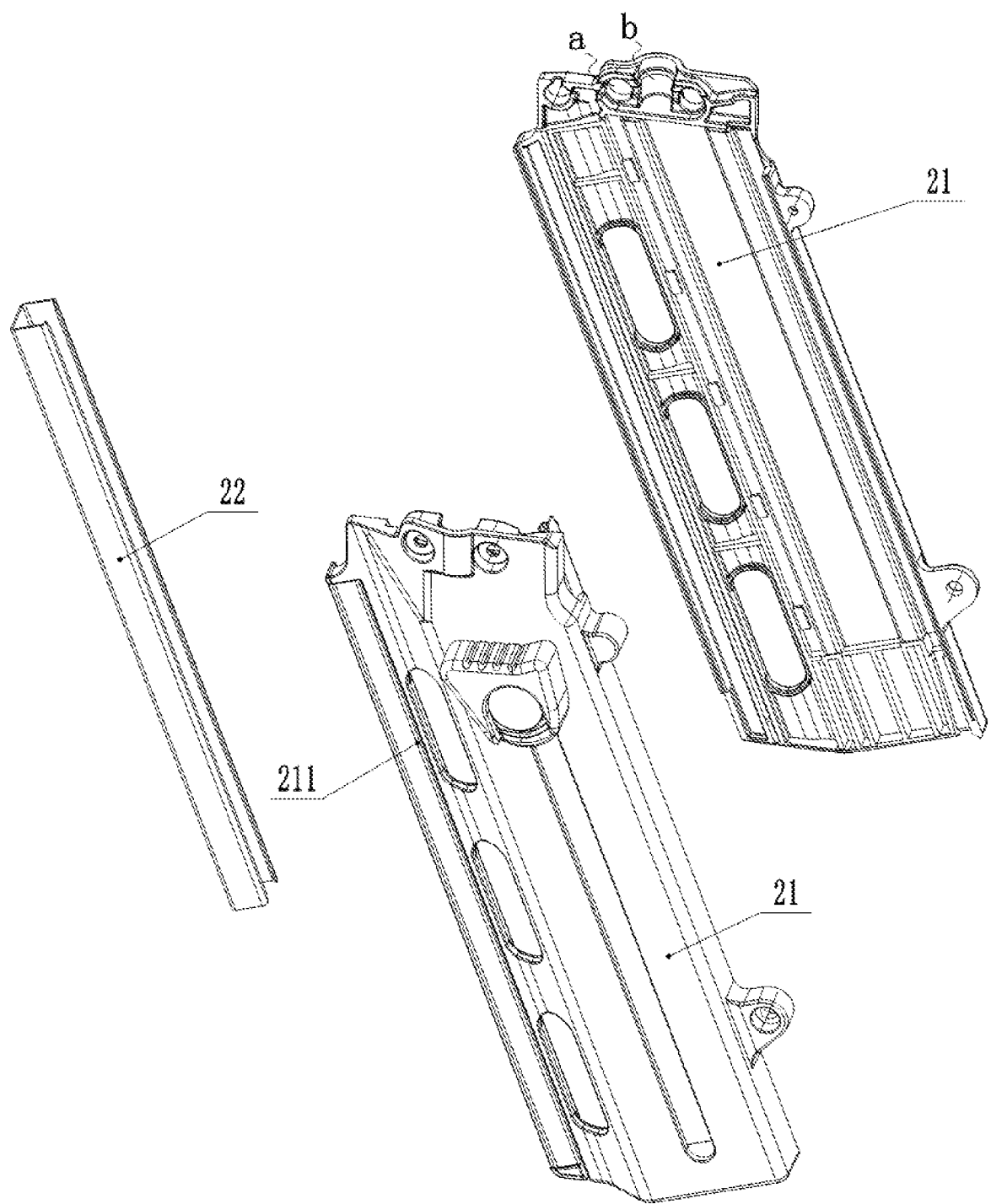
FIG. 6 is an exploded view of FIG. 5.
Figure 7:
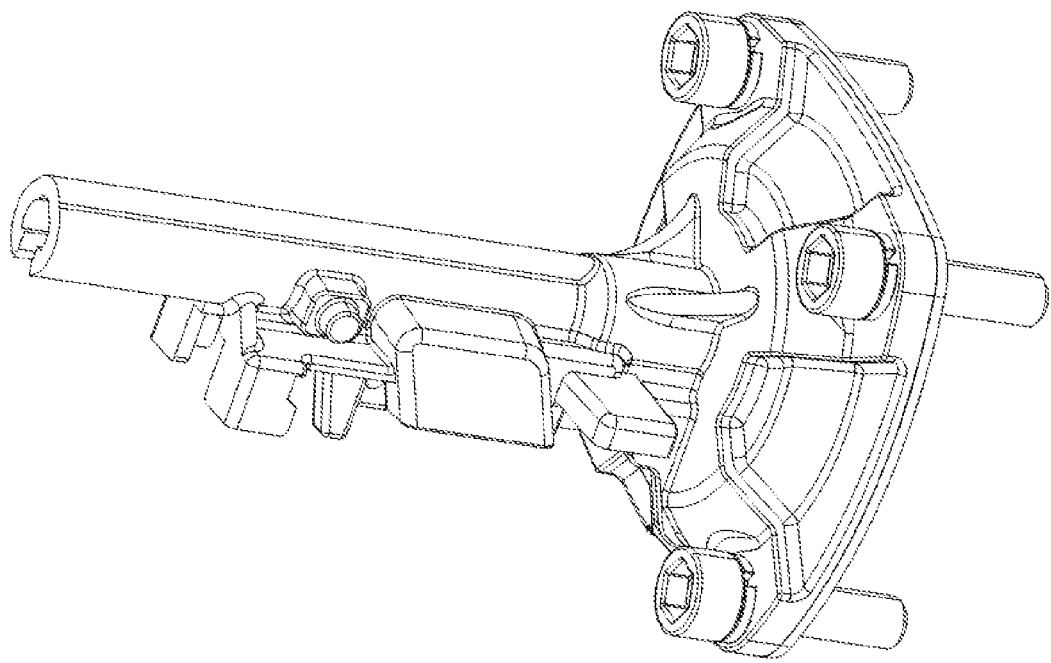
FIG. 7 is a schematic view of the existing nail head.
Figure 8:
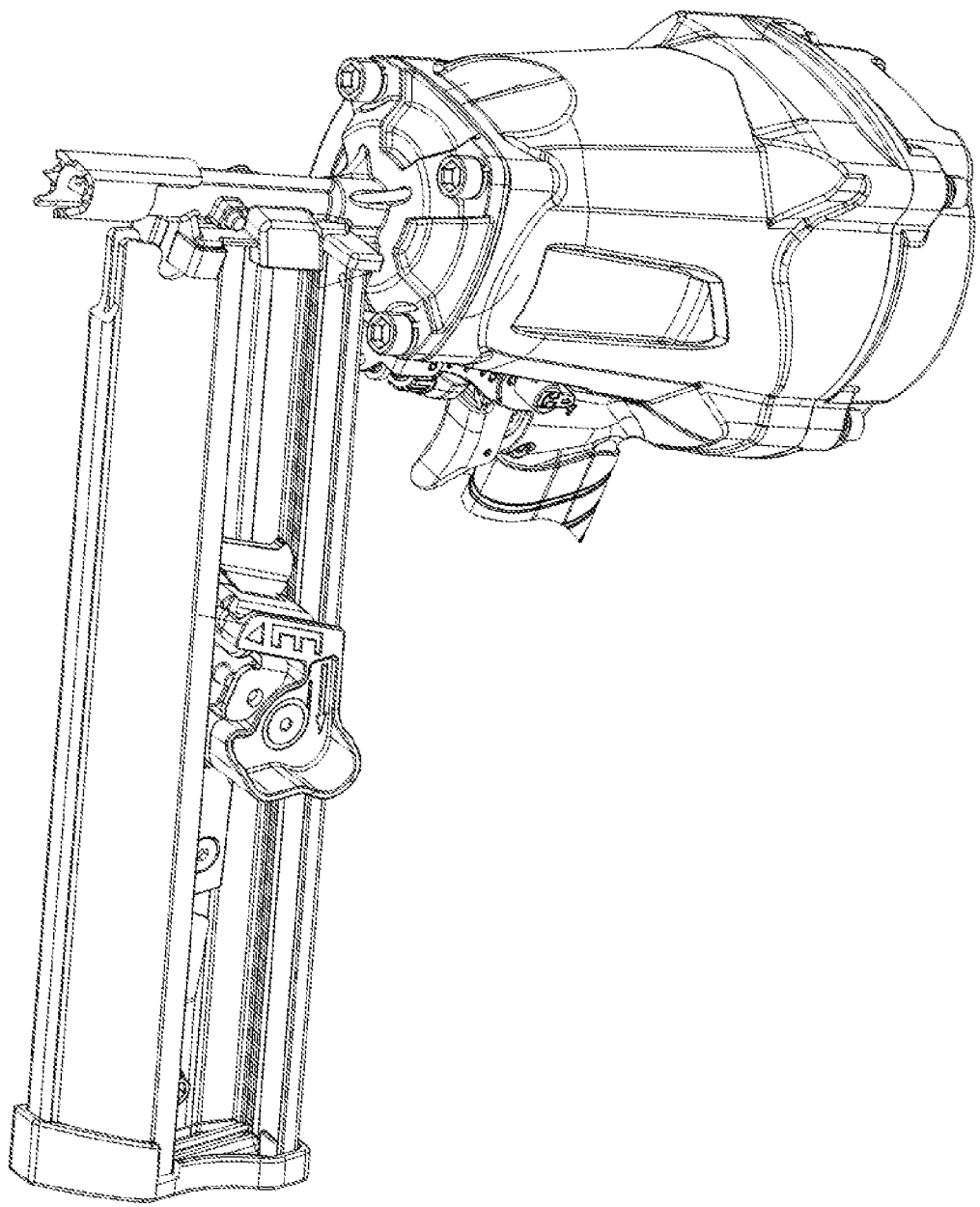
FIG. 8 is a schematic view of the existing nail gun.

As shown in FIGS. 4 to 6, the nail magazine (2) includes two shell plates (21) detachably connected. The inner and outer sides of the nail head (3) each have integrally formed two first screw columns (31) and one second screw column (33). The two first screw columns (31) are connected by a rib (32), the second screw column (33) is located between the two first screw columns (31) and is perpendicular to the rib (32), and both shell plates (21) have a first accommodating chamber (a) and a second accommodating chamber (b) formed thereon. The first accommodating chamber (a) is for accommodating the first screw columns (31) and the rib (32), and the second accommodating chamber (b) is for accommodating the second screw column (33). The nail magazine adopts a split design, both shell plates have first and second accommodating chambers, providing good containment for the first screw columns, rib, and second screw column, improving the assembly precision between the nail head, nail magazine, and gun body, and facilitating the positioning and installation of the nail head. The nail exit structure is more compact and reasonable.

As shown in FIGS. 5 and 6, the two shell plates (21) are made of a lightweight composite material. One end of the two shell plates (21) has a groove (211) formed thereon and is connected by embedding a spring piece (22) into the groove (211), and the other end of the two shell plates (21) is connected by screw fastening. The use of lightweight material effectively reduces the overall weight of the nail gun, making it easier to extend working hours and relieve fatigue. The spring piece is elastically deformed and embedded in the groove, ensuring that the two shell plates remain tightly attached during the use of the nail gun. One end of the nail magazine uses a spring piece fastening method, ensuring the stability of the overall structure of the nail magazine.

Figure 2:
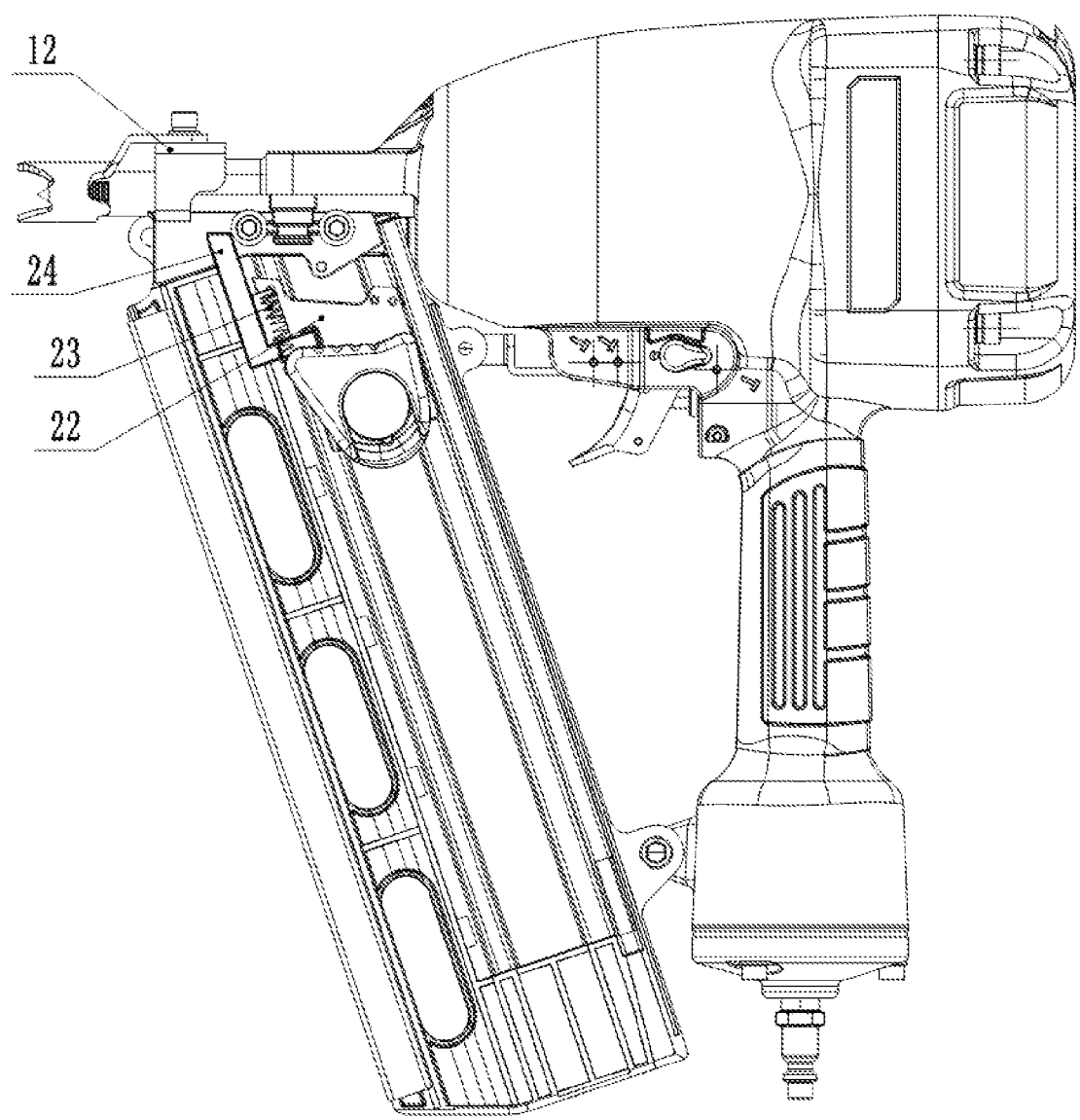
FIG. 2 is a front view of a nail gun with a hidden nail head structure according to the present invention (with one shell plate hidden)
Figure 3:
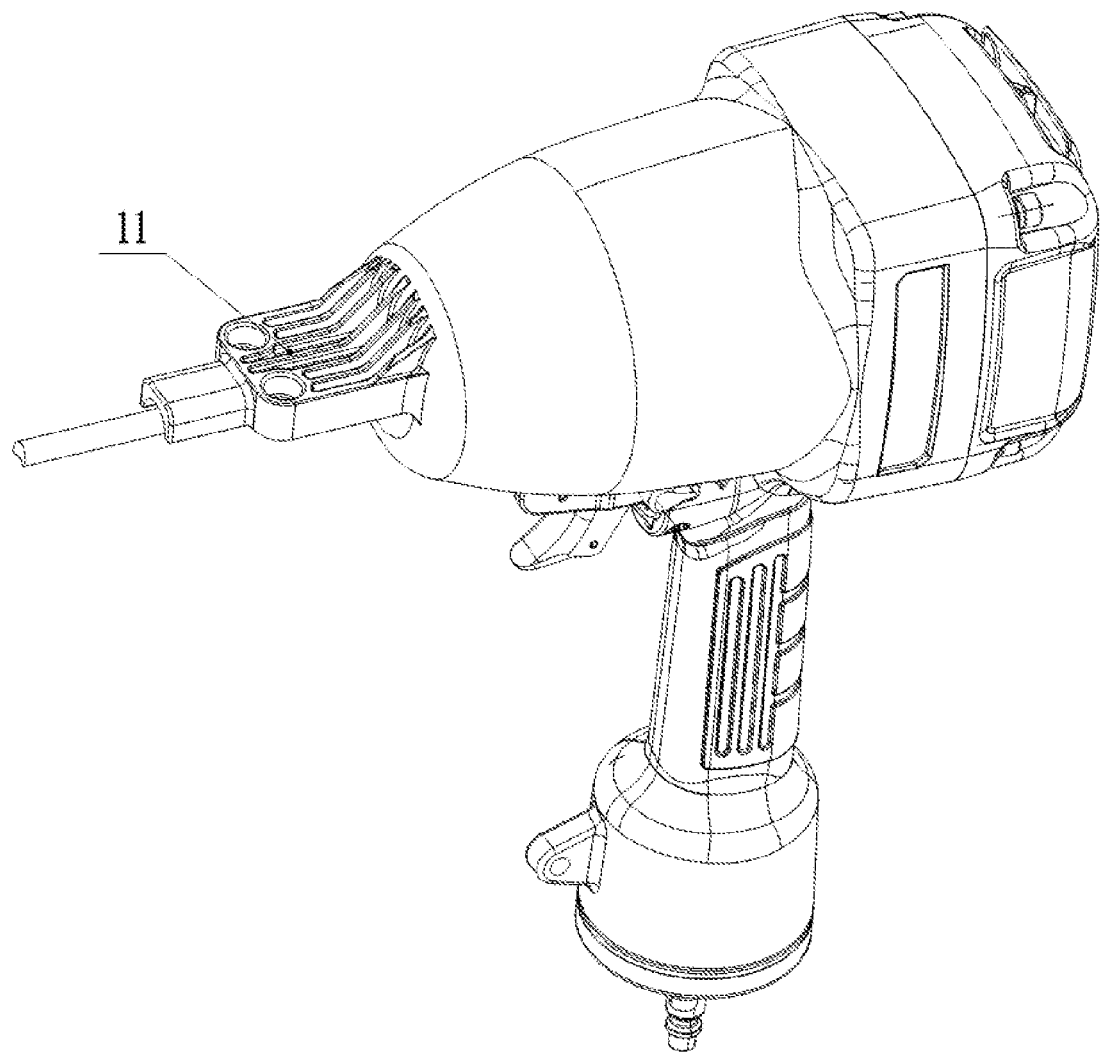
FIG. 3 is a schematic view of the gun body involved in the present invention.

As shown in FIG. 2, the gun body (1) includes a safety frame (12), and the nail magazine (2) has a built-in push nail plate (22), a limit block (24), and a limit block reset spring (23). The push nail plate (22) can drive the limit block (24) to move upward when it reaches the high position, to restrict the movement of the safety frame (12) and prevent the nail gun from empty firing. When nails are lacking, the safety frame cannot move, avoiding empty firing and damage to the surface of objects.

The nail head (3) is provided with a nail fixing device to prevent nails from falling out of the muzzle before firing. The nail fixing device can be a magnet, which has an adsorption effect on the top nail of the row of nails. During the nailing process, if the top nail in the row separates before nailing, the magnet can also adsorb the separated individual nail, preventing the separated nail from sliding out.

The insertion-type installation method allows the nail head to be hidden, making the overall appearance of the nail gun more elegant and attractive, with convenient assembly and connection, a more stable structure, a simplified nail head structure, more convenient processing of components, and reduced manufacturing costs. The nail magazine adopts a split design, both shell plates have first and second accommodating chambers, providing good containment for the first screw columns, rib, and second screw column, improving the assembly precision between the nail head, nail magazine, and gun body, and facilitating the positioning and installation of the nail head. The nail exit structure is more compact and reasonable. The nail magazine's one end uses a spring piece fastening method to secure the two shell plates, ensuring the stability of the overall structure of the nail magazine. The nail gun has anti-empty firing functionality.

The above description is only for the preferred embodiments of the present invention and is not intended to limit the invention. For those skilled in the art, various changes and modifications can be made to the invention within the spirit and principles of the invention. Any modification, equivalent replacement, or improvement made within the spirit and principles of the present invention should be included within the scope of protection of the present invention.

In addition to the features mentioned above, other possible enhancements and improvements can be made to the nail gun with a hidden nail head structure. For example, the nail magazine can be designed to accommodate various sizes and types of nails, making the nail gun more versatile for different applications. Moreover, the nail gun can be equipped with an adjustable depth control mechanism to enable users to precisely control the depth of nail penetration into different materials. This feature would be particularly useful for tasks that require a consistent and precise depth of nail penetration, such as in woodworking or construction projects.

Furthermore, the nail gun can be designed with ergonomic considerations in mind to ensure comfortable and safe usage over extended periods. This can be achieved by incorporating features such as a comfortable grip, a well-balanced design, and a reduced overall weight. Additionally, safety features such as trigger locks, anti-dry fire mechanisms, and easy-to-access on/off switches can be integrated into the design to minimize the risk of accidental injury during operation.

The hidden nail head structure in the nail gun can also be applied to other types of fastening tools, such as staple guns or screw guns, providing similar benefits in terms of aesthetics, stability, and reduced manufacturing costs. This would allow for a range of tools with hidden fastening head structures to be developed, providing users with a consistent and attractive design across multiple tools in their collection.

In summary, the nail gun with a hidden nail head structure provides a more elegant and attractive appearance, convenient assembly and connection, a more stable structure, a simplified nail head structure, more convenient component processing, and reduced manufacturing costs. These features, along with potential enhancements and improvements, make this nail gun a valuable tool for various applications in construction, woodworking, and other industries.

We claim:
1. A nail gun with a hidden nail head structure, comprising a gun body (1), a nail magazine (2), and a nail head (3)

located at a nail exit of the nail magazine (2); the nail magazine (2) being a component for supplying nails, and the gun body (1) being a component for striking nails, wherein the gun body (1) has a connecting portion (11) extending toward the nail exit, both sides of the nail head (3) are fixedly connected to the nail magazine (2) by first fasteners, and an upper part of the nail head (3) is fixed to the connecting portion (11) by second fasteners, to achieve a hidden installation of the nail head (3);

wherein the nail magazine (2) includes two shell plates (21) detachably connected, inner and outer sides of the nail head (3) each have integrally formed two first screw columns (31) and one second screw column (33), the two first screw columns (31) are connected by a rib (32), the second screw column (33) is located between the two first screw columns (31) and is perpendicular to the rib (32), and both shell plates (21) have a first accommodating chamber (a) and a second accommodating chamber (b) formed thereon, the first accommodating chamber (a) being for accommodating the first screw columns (31) and the rib (32), and the second accommodating chamber (b) being for accommodating the second screw column (33).

2. The nail gun with the hidden nail head structure according to claim 1, wherein the two shell plates (21) are made of a lightweight composite material, one end of the two shell plates (21) has a groove (211) formed thereon and is connected by embedding a spring piece (22) into the groove (211), and the other end of the two shell plates (21) is fastened together by screws.

3. The nail gun with the hidden nail head structure according to claim 1, wherein the gun body (1) includes a safety frame (12), and the nail magazine (2) comprises a built-in push nail plate (22), a limit block (24), and a limit block reset spring (23), when the push nail plate (22) reaches a high position, the push nail plate (22) drives the stopper block (24) to move upward, thereby restricting a movement of the safety frame (12) to prevent dry firing of the nail gun.

* * * * *